(No Model.)
W. MEDLIN.
MASH TUB.
No. 431,372. Patented July 1, 1890.
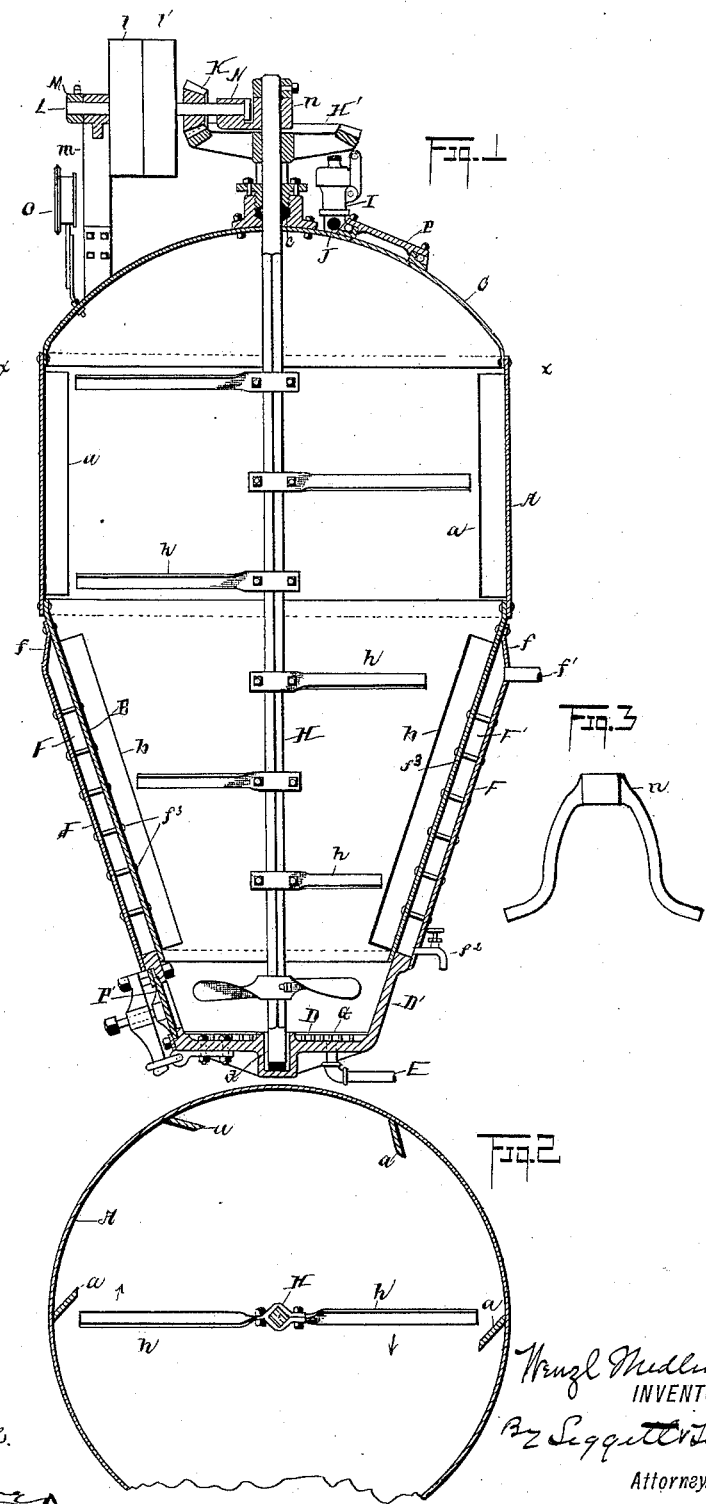
WITNESSES
Wenzl Medlin
INVENTOR
By Liggett & Liggett
Attorneys

UNITED STATES PATENT OFFICE.

WENZL MEDLIN, OF CLEVELAND, OHIO.

MASH-TUB.

SPECIFICATION forming part of Letters Patent No. 431,372, dated July 1, 1890.

Application filed April 30, 1888. Renewed April 7, 1890. Serial No. 346,822. (No model.)

*To all whom it may concern:*

Be it known that I, WENZL MEDLIN, of Cleveland, in the county of Cuyahoga and State of Ohio, have invented certain new and useful Improvements in Mash-Tubs; and I do hereby declare the following to be a full, clear, and exact description of the invention, such as will enable others skilled in the art to which it pertains to make and use the same.

My invention relates to a combined mash-tub and brew-kettle; and it consists in certain features of construction and in combination of parts hereinafter described, and pointed out in the claims.

In the accompanying drawings, Figure 1 is an elevation in section taken through the center of the device. Fig. 2 is a plan in section on line *x x*, Fig. 1. Fig. 3 is an elevation in detail.

In carrying out my invention the combined mash-tub and brew-kettle is an upright structure, consisting of cylindrical section A, inverted conical section B, and crowning upper head C, all of these members being of plate metal and riveted together after the manner of making steam-boilers. The lower head D is preferably of cast metal, having a flaring upwardly-projecting rim D', that fits next outside of the lower end of plate B. Casing F surrounds section B, the upper portion of this casing being offset or flanged at *f* to join the inner plate B, to which it is riveted. Plates B and F at the lower ends thereof embrace the upper portion of rim D', these three members being riveted together, this rim at the upper extreme being thick enough to separate the plates a suitable distance to form a steam-chamber F', this part of the device being known as a "steam-jacket," induction steam-pipe *f'*, drain-cock *f²*, and the necessary stay-bolts *f³* being of course provided.

E is a pipe connecting with the bottom of head D for draining the vessel and for other purposes, hereinafter explained. Just above the inner face of head D is a perforated false bottom or strainer G. A depression *d* in head D serves as a box and stepping for the upright shaft H, this shaft passing out above through stuffing-box *c*. Shaft H is provided with a series of radial arms *h*, the blades thereof being set at an angle of about forty-five degrees, more or less, from a perpendicular line, the lower edge of these blades moving in advance as the shaft is rotated, by means of which the tendency of the blades is to elevate the mass in the vessel. Section A is provided with a series of wings *a*, and section B is provided with a series of wings *b*, these wings being set approximately at an angle of about forty-five degrees from radial lines. (See Fig. 2.) The action of these wings on the mass that is being rotated by arms *h* is to throw the mass toward the center of the vessel. By means of the inverted conical section B the bottom portion of the vessel is contracted, so that in removing the refuse—that is to say, the spent malt—such removal is more easily accomplished than if the malt was spread over a larger surface.

I is a safety-valve, and preferably leading from the same nozzle near head C is pipe J, for purposes hereinafter mentioned. On the upper end of shaft H is mounted beveled gear H', the latter engaging pinion K on driving-shaft L. Shaft L is provided with driving and loose pulleys, *l* and *l'*, respectively, and is supported by boxes M and N, the former being connected with standards *m* and the latter being integral with yoke *n*.

O is a pressure-gage, and P and P' are hand-holes for charging and discharging the vessel.

In operating the device, first, the vessel is charged with a suitable quantity of ground malt, and water is added. The mass by means of the steam-jacket is heated until a steam-pressure of about twenty-five pounds per square inch is had in the vessel. Meantime the mass is agitated and thoroughly mixed by the action of arms *h*. This treatment is continued usually from an hour and a half to two hours, or until certain chemical changes well known to the trade have taken place. Next, by means of pipe E, the wort is drawn off and the refuse malt is removed through hand-hole P', and the inside of the vessel is cleansed. The wort is then returned to the vessel and the latter is closed, after which the wort is heated to some degrees above the boiling-point. Meantime air under pressure is forced through pipe E, such air and the vapor from the wort being drawn off through pipe J by means usually of a fan, (not shown,) so as to cause a partial vacuum in the vessel. This treatment of purifying the wort is continued usually from three and a half to four hours. The hops are then introduced through hand-hole P, and the vessel is again closed. The mass is heated until a steam-pressure of about twenty-five pounds per square inch is had in the vessel, the mass meantime being more or less stirred. This latter treatment is continued until the beer is sufficiently cooked, after which it is drawn off through pipe E. The vessel is then cleansed and is ready for another charge.

What I claim is—

1. A combined wort-vat and brewing-kettle, consisting, essentially, of an upright vessel having a cylindrical upper section joined to an inverted conical lower section, the lower having a steam-jacket, an upright shaft, and attached inclined arms or blades for stirring purpose, and wings arranged on the internal periphery of the vessel for deflecting the mass toward the center of the vessel, the parts being arranged substantially as set forth.

2. In a combined wort-vat and brewing-kettle, the combination, with upright vessel, steam-jacket surrounding a portion of the latter, a shaft revolubly supported in the vessel, stirring-arms attached to the shaft, and deflecting-wings on the inner wall of the vessel, of safety-valve, pipes leading, respectively, from the top and bottom of the vessel, and hand-holes for charging and discharging the vessel, the parts being arranged substantially as set forth.

In testimony whereof I sign this specification, in the presence of two witnesses, this 10th day of February, 1888.

WENZL MEDLIN.

Witnesses:
CHAS. H. DORER,
ALBERT E. LYNCH.